United States Patent
Sun

(10) Patent No.: US 6,745,167 B2
(45) Date of Patent: Jun. 1, 2004

(54) FUZZY-NEURO METHOD FOR DISCRIMINATING OPTICAL DISK TYPE

(75) Inventor: Yu-Hung Sun, Taipei (TW)

(73) Assignee: Lite-On It Corporation, Taipei (TW)

( * ) Notice: Subject to any disclaimer, the term of this patent is extended or adjusted under 35 U.S.C. 154(b) by 497 days.

(21) Appl. No.: 09/817,285

(22) Filed: Mar. 27, 2001

(65) Prior Publication Data

US 2002/0174080 A1 Nov. 21, 2002

(51) Int. Cl.[7] .......................... G06F 15/18; G11B 7/00; G05B 13/02
(52) U.S. Cl. .......................... 706/8; 706/2; 369/44.35; 369/44.29; 700/50; 700/59
(58) Field of Search .......................... 706/8, 2, 1, 15; 369/59.1, 53.11, 44.35, 44.29, 43, 30.29; 700/48, 50, 57, 59

(56) References Cited

U.S. PATENT DOCUMENTS

| | | | | |
|---|---|---|---|---|
| 5,136,569 A | * | 8/1992 | Fennema et al. | 369/53.23 |
| 5,289,451 A | * | 2/1994 | Ashinuma et al. | 369/47.55 |
| 5,424,886 A | * | 6/1995 | Tomitaka | 360/77.01 |
| 5,485,444 A | * | 1/1996 | Kuhn et al. | 369/53.15 |
| 5,856,965 A | * | 1/1999 | Tsuchiya et al. | 369/53.2 |
| 5,859,822 A | * | 1/1999 | Inoue et al. | 369/53.22 |
| 5,909,419 A | * | 6/1999 | Kamiyama | 369/53.23 |
| 5,966,357 A | * | 10/1999 | Ryoo | 369/53.23 |
| 6,111,832 A | * | 8/2000 | Tsuchiya et al. | 369/53.23 |
| 6,285,635 B1 | * | 9/2001 | Watanabe et al. | 369/44.27 |
| 6,493,304 B2 | * | 12/2002 | Watanabe et al. | 369/53.22 |
| 6,526,008 B1 | * | 2/2003 | Caponetto et al. | 369/44.35 |

OTHER PUBLICATIONS

Yen et al., "Servo Controller Design for an Optical Disk Drive Using Fuzzy Control Algorithm", IEEE International Conference o Fuzzy Systems, Mar. 1992, pp. 989–997.*

Aslandogan et al., "Design, Implementation and Evaluation of SCORE (a System for COntent based REtrieval of pictures)", ICDE, 1995, pp. 280–287.*

* cited by examiner

Primary Examiner—Wilbert L. Starks, Jr.
Assistant Examiner—Kelvin Booker
(74) Attorney, Agent, or Firm—Rosenberg, Klein & Lee

(57) ABSTRACT

A fuzzy-neuro method uses a neuro network to discriminate optical disk type. The fuzzy-neuro method establishes a plurality of characteristic signal sets corresponding to the optical disks of various formats; and uses the neuro network to match the optical disk under question to the characteristic signal sets for finding the type thereof.

6 Claims, 1 Drawing Sheet

FUZZY-NEURO METHOD FOR DISCRIMINATING OPTICAL DISK TYPE

FIELD OF THE INVENTION

The present invention relates to a fuzzy-neuro method for discriminating optical disk, especially to a fuzzy-neuro method using a simple architecture to discriminate optical disk type for an optical disk driver.

BACKGROUND OF THE INVENTION

The conventional optical disks have many different kinds of formats such as CD, CD-R, CD-RW, single-layer DVD (DVD5), double-layer DVD (DVD9), DVD-R and DVD-RAM. The different kinds of optical disks have different data formats and physical characteristics. Therefore, the optical disk driver read different kinds of optical disks in different schemes. For example, the optical disk driver uses 780 nm laser for reading CD and 650 nm laser for reading DVD, some of the signals read from optical disk even requires amplification. The optical disk driver compatible to a plurality of kinds of optical disks needs an optical disk discriminating step to determine suitable accessing scheme.

The conventional optical disk driver uses the electrical signals such as focus error (FE), sub-beam add (SBAD) or RF envelope (RFENV) to discriminate the disk type. The electrical signals are converted from the optical signals detected by the pick-up head thereof. The optical disk driver sets different threshold levels corresponding to those electrical signals and uses bi-sectional method to compare each electrical signal with corresponding threshold level. The optical disk driver can discriminate the disk type by the comparison results of those electrical signals. However, bi-sectional method is not immune to measurement error and the discrimination may be deteriorated by the measurement error.

SUMMARY OF THE INVENTION

It is the object of the present invention to provide a fuzzy-neuro method using a simple architecture to discriminate optical disk type for an optical disk driver.

To achieve above object, the present invention provides a fuzzy-neuro method to discriminate optical disk type by using a neuro network. The method fuzzy quantizes a plurality of electrical signals measured from optical disks of various formats and establishing a plurality of characteristic signal sets ($W_{cd}$, $W_{cdr}$, $W_{cdrw}$, $W_{dvd5}$ and $W_{dvd9}$) corresponding to the optical disks of various formats (including CD, CD-R, CD-RW, DVD5, DVD9). The electrical signals include focus error (FE) signal, sub-beam add (SBAD) signal, and RF envelope (RFENV) signal. The plurality of electrical signals from an optical disk to be discriminated is measured to obtain an input signal set. The signal set is sent to an input layer of the neuro network and the characteristic signal sets are stored in a distance layer of the neuro network. The distance layer of the neuro network computes the distances ($d_{cd}$, $d_{cdr}$, $d_{cdrw}$, $d_{dvd5}$ and $d_{dvd9}$) of the input signal set with respect to the characteristic signal sets stored in the distance layer of the neuro network. The distances of the input signal set with respect to the characteristic signal sets are sent to a distance value compare block of the neuro network. The distance value compare block select the minimal one among the computed distances; the characteristic signal set with minimal distance determines the type of the optical disk under question.

The various objects and advantages of the present invention will be more readily understood from the following detailed description when read in conjunction with the appended drawing, in which:

DETAILED DESCRIPTION OF THE INVENTION

Figure 1:
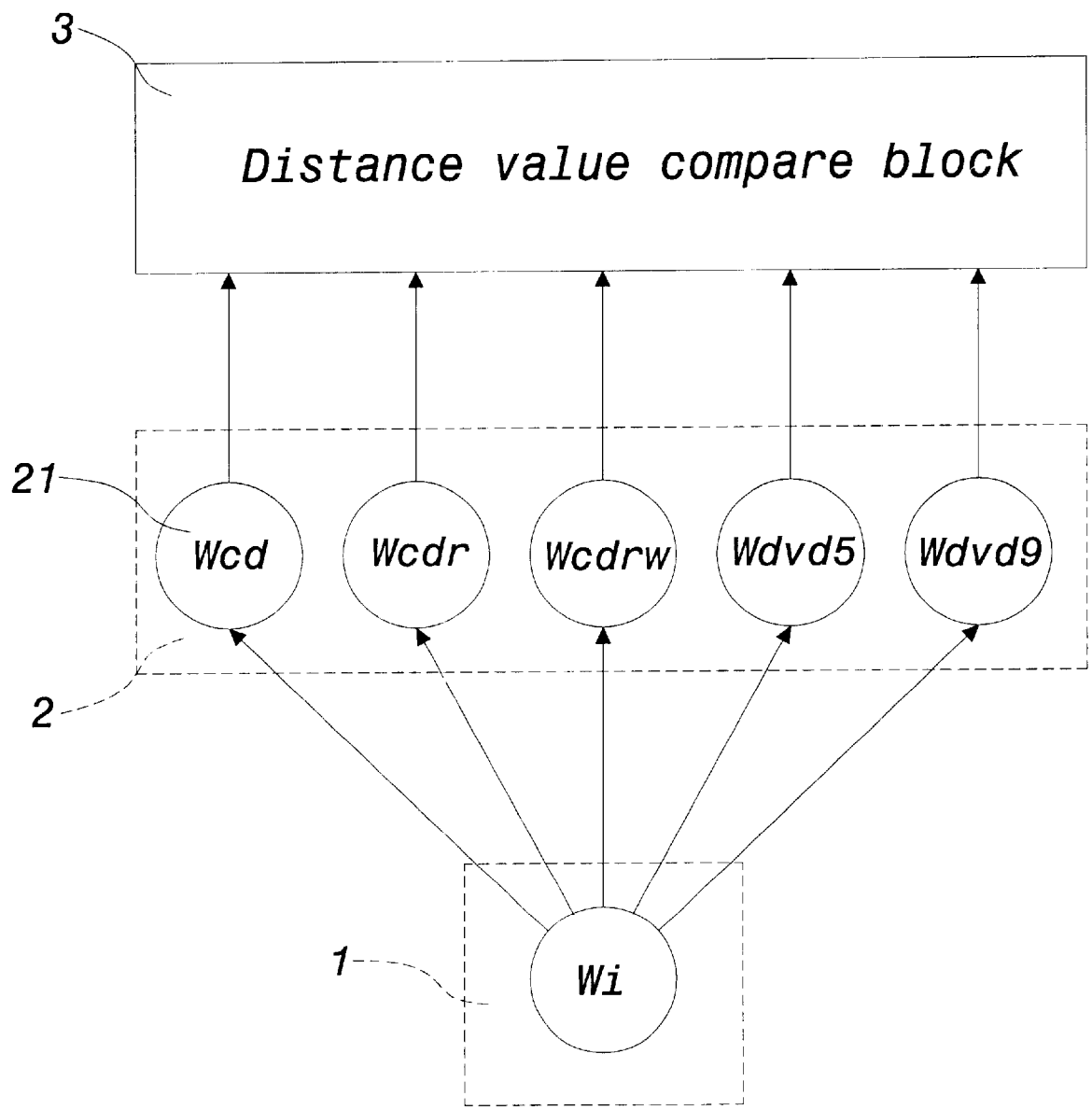
FIG. 1 shows the block diagram of the fuzzy-neuro network according to the present invention.

The present invention provides a fuzzy-neuro method to discriminate optical disk type for an optical disk driver. The fuzzy-neuro method of the present invention performs fuzzy-quantization to a plurality of electrical signals including focus error (FE) signal, sub-beam add (SBAD) signal, and RF envelope (RFENV) signal, wherein the number of quantization levels and quantization conditions can be defined by user for each electrical signal. Table 1 shows the fuzzy-quantization scheme for the focus error signal. When the focus error signal is smaller than or equal to 10, the quantization level is very small and the quantization number is set to 0. When the focus error signal is smaller than or equal to 60 and larger than 10, the quantization level is small and the quantization number is set to 1. When the focus error signal is smaller than or equal to 120 and larger than 60, the quantization level is medium and the quantization number is set to 2. When the focus error signal is smaller than or equal to 150 and larger than 120, the quantization level is larger and the quantization number is set to 3. When the focus error signal is larger than 150, the quantization level is very large and the quantization number is set to 4. By quantizing the electrical signals of interest to a plurality quantization levels with reference to user-defined quantization condition, a plurality of characteristic signal sets each corresponding to one specific optical disk type can be defined.

TABLE 1

| quantization level | very large | large | Moderate | Small | very small |
| --- | --- | --- | --- | --- | --- |
| quantization number | 4 | 3 | 2 | 1 | 0 |
| quantization condition | FE > 150 | 120 < FE ≤ 150 | 60 < FE ≤ 120 | 10 < FE ≤ 60 | FE ≤ 10 |

Table 2 demonstrates the application of the characteristic signal sets for various types of optical disks. Each kind of optical disk has a specific typical signal set. Moreover, the user can allocate a weight to each electrical signal to represent the significance of the electrical signal to the optical disk. The characteristic signal sets for various types of optical disks can be denoted by linguistic names such as $W_{cd}$, $W_{cdr}$, $W_{cdrw}$, $W_{dvd5}$, and $W_{dvd9}$. For example, the characteristic signal set for CD is $W_{cd}=\{1,1,2,2,1,3,2,2,4\}$;

the characteristic signal set for CD-R is $W_{cdr}=\{1,1,2,2,1,0,2,2,4\}$;

the characteristic signal set for CD-RW is $W_{cdrw}=\{0,0,1,1,0,1,1,1,2\}$;

the characteristic signal set for DVD5 is $W_{dvd5}=\{1,0,1,2,2,4,1,1,2\}$;

the characteristic signal set for DVD9 is $W_{dvd5}=\{1,0,1,1,1,2,1,1,1\}$.

TABLE 2

| | Input Signal | | | | | | | | |
|---|---|---|---|---|---|---|---|---|---|
| Disk Type | FE (650 nm) | SBAD (650 nm) | RFENV (650 nm) | FE (780 nm) | SBAD (780 nm) | RFENV (780 nm) | Other electrical signal 1 | Other electrical signal 2 | Other electrical signal 3 |
| CD | 1 | 1 | 2 | 2 | 1 | 3 | 2 | 2 | 4 |
| CD-R | 1 | 1 | 2 | 2 | 1 | 0 | 2 | 2 | 4 |
| CD-RW | 0 | 0 | 1 | 1 | 0 | 1 | 1 | 1 | 2 |
| DVD5 | 1 | 0 | 1 | 2 | 2 | 4 | 1 | 1 | 2 |
| DVD9 | 1 | 0 | 1 | 1 | 1 | 2 | 1 | 1 | 1 |
| weights | 0.1 | 0.2 | 0.1 | 0.1 | 0.1 | 0.1 | 0.1 | 0.1 | 0.1 |

FIG. 1 shows the block diagram of the fuzzy-neuro network according to the present invention. The fuzzy-neuro network according to the present invention comprises an input layer 1, a distance layer 2 and a distance value compare block 3. The input layer 1 comprises an input signal set Wi and the distance layer 2 comprises a plurality of nodes 21 storing the characteristic signal sets corresponding to $W_{cd}$, $W_{cdr}$, $W_{cdrw}$, $W_{dvd5}$ and $W_{dvd9}$, respectively. The nodes 21 can compute the variance of the input signal set Wi with respect to the characteristic signal sets and obtains the distances $d_{cd}$, $d_{cdr}$, $d_{cdrw}$, $d_{dvd5}$ and $d_{dvd9}$, respectively. The distances $d_{cd}$, $d_{cdr}$, $d_{cdrw}$, $d_{dvd5}$ and $d_{dvd9}$ is then sent to the distance value compare block 3 to find the minimal one among those distances. The characteristic signal set with minimal distance can determine the type of the optical disk under question.

For example, if an optical disk has an input signal set Wi={1,0,2,2,2,4,2,2,4} input the input layer 1. The input signal set Wi is used to compute the distance (variance) with the characteristic signal sets stored in the distance layer 2.

The distances $d_{cd}$ to the characteristic signal set of CD is:

$$d_{cd}=(1-1)^2 \times 0.1+(0-1)^2 \times 0.2+(2-2)^2 \times 0.1+(2-2)^2 \times 0.1+(2-1)^2 \times 0.1+(4-3)^2 \times 0.1+(2-2)^2 \times 0.1+(2-2)^2 \times 0.1+(4-4)^2 \times 0.1=0.4.$$

Similarly, the distances $d_{cdr}$ to the characteristic signal set of CD-R is:

$$d_{cdr}=(1-1)^2 \times 0.1+(0-1)^2 \times 0.2+(2-2)^2 \times 0.1+(2-2)^2 \times 0.1+(2-1)^2 \times 0.1+(4-0)^2 \times 0.1+(2-2)^2 \times 0.1+(2-2)^2 \times 0.1+(4-4)^2 \times 0.1=1.9.$$

Similarly, the distances $d_{cdrw}$ to the characteristic signal set of CD-RW is:

$$d_{cdrw}=(1-0)^2 \times 0.1+(0-0)^2 \times 0.2+(2-1)^2 \times 0.1+(2-1)^2 \times 0.1+(2-0)^2 \times 0.1+(4-1)^2 \times 0.1+(2-1)^2 \times 0.1+(2-1)^2 \times 0.1+(4-2)^2 \times 0.1=2.2.$$

Similarly, the distances $d_{dvd5}$ to the characteristic signal set of DVD5 is:

$$d_{dvd5}=(1-1)^2 \times 0.1+(0-0)^2 \times 0.2+(2-1)^2 \times 0.1+(2-2)^2 \times 0.1+(2-2)^2 \times 0.1+(4-4)^2 \times 0.1+(2-1)^2 \times 0.1+(2-1)^2 \times 0.1+(4-2)^2 \times 0.1=0.7.$$

Similarly, the distances $d_{dvd9}$ to the characteristic signal set of DVD9 is:

$$d_{dvd9}=(1-1)^2 \times 0.1+(0-0)^2 \times 0.2+(2-1)^2 \times 0.1+(2-1)^2 \times 0.1+(2-1)^2 \times 0.1+(4-2)^2 \times 0.1+(2-1)^2 \times 0.1+(2-1)^2 \times 0.1+(4-1)^2 \times 0.1=1.8.$$

The computed distances are sent to the distance value compare block 3, which select the minimal one among the computed distances. The characteristic signal set with minimal distance can determines the type of the optical disk under question. That is the input optical disk of the above example is CD.

Although the present invention has been described with reference to the preferred embodiment thereof, it will be understood that the invention is not limited to the details thereof. Various substitutions and modifications have suggested in the foregoing description, and other will occur to those of ordinary skill in the art. Therefore, all such substitutions and modifications are intended to be embraced within the scope of the invention as defined in the appended claims.

I claim:

1. A computer implemented method for discriminating optical disk type composing the following steps:

(a) performing a fuzzy-quantization to a plurality of electrical signals measured from optical disks of various formats and establishing a plurality of characteristic signal sets corresponding to the optical disks of various formats;

(b) measuring the plurality of electrical signals from an optical disk to be discriminated and obtaining an input signal set for the optical disk to be discriminated;

(c) computing the distances respectively from the input signal set to the characteristic signal sets; and (d) determining the type of the optical disk to be discriminated by selecting the characteristic signal set with minimal computed distance.

2. The method for discriminating optical disk type as in claim 1, wherein the plurality of electrical signals include focus error (FE) signal, sub-beam add (SBAD) signal, and RF envelope (RFENV) signal.

3. The method for discriminating optical disk type as in claim 1, wherein the step of performing the fuzzy-quantization further includes the steps of:

determining quantization levels for each electrical signal; and determining quantization conditions for each electrical signal.

4. A fuzzy-neuro method for discriminating optical disk type by using a neuro network, the method comprising the following steps:

(a) performing a fuzzy-quantization to a plurality of electrical signals measured from optical disks of various formats and establishing a plurality of characteristic signal sets corresponding to the optical disks of various formats;

(b) measuring the electrical signals from an optical disk to be discriminated and obtaining an input signal set for the optical disk to be discriminated;

(c) storing the characteristic signal sets in a distance layer of the neuro network;

(d) computing the distances from the input signal set to the characteristic signal sets, respectively; and (e) determining the type of the optical disk to be discriminated by selecting the characteristic signal set with minimal computed distance.

5. The fuzzy-neuro method for discriminating optical disk type as in claim 4, wherein the plurality of electrical signals comprise focus error (FE) signal, sub-beam add (SBAD) signal, and RF envelope (RFENV) signal.

6. The fuzzy-neuro method for discriminating optical disk type as in claim 4, wherein the step of performing the fuzzy-quantization further includes the steps of:

determining quantization levels for each electrical signal; and determining quantization conditions for each electrical signal.

* * * * *